(12) United States Patent
Murakami et al.

(10) Patent No.: US 9,920,863 B2
(45) Date of Patent: Mar. 20, 2018

(54) FLEXIBLE PIPE

(71) Applicant: DAIKIN INDUSTRIES, LTD., Osaka-Shi, Osaka (JP)

(72) Inventors: Shinya Murakami, Osaka (JP); Takeshi Inaba, Osaka (JP); Takahiro Kitahara, Osaka (JP); Yuuki Kuwajima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/518,145

(22) PCT Filed: Oct. 6, 2015

(86) PCT No.: PCT/JP2015/078310
§ 371 (c)(1),
(2) Date: Apr. 10, 2017

(87) PCT Pub. No.: WO2016/060010
PCT Pub. Date: Apr. 21, 2016

(65) Prior Publication Data
US 2017/0307113 A1    Oct. 26, 2017

(30) Foreign Application Priority Data

Oct. 17, 2014  (JP) .................. 2014-212812

(51) Int. Cl.
*F16L 11/08* (2006.01)
*C08J 5/00* (2006.01)
*E21B 17/01* (2006.01)

(52) U.S. Cl.
CPC .................. *F16L 11/08* (2013.01); *C08J 5/00* (2013.01); *E21B 17/01* (2013.01); *C08J 2327/18* (2013.01)

(58) Field of Classification Search
CPC .......... F16L 11/08; C08J 5/00; C08J 2327/18; E21B 17/01
See application file for complete search history.

(56) References Cited

U.S. PATENT DOCUMENTS

2012/0015124 A1    1/2012  Kitahara et al.

FOREIGN PATENT DOCUMENTS

WO    2010/110129 A1    9/2010

OTHER PUBLICATIONS

International Preliminary Report on Patentability and Translation of Written Opinion, dated Apr. 18, 2017, from the International Bureau in counterpart International application No. PCT/JP2015/078310.
(Continued)

*Primary Examiner* — Michael C Miggins
(74) *Attorney, Agent, or Firm* — Sughrue Mion, PLLC

(57) ABSTRACT

The present invention provides a flexible pipe having excellent blister resistance in a high-temperature and high-pressure environment even though including a thick resin pipe. The flexible pipe includes a resin pipe having a thickness of greater than 5 mm. The resin pipe is formed from a resin having a $CO_2$ permeability coefficient $P(CO_2)$ of $20 \times 10^{-9}$ $cm^3 \cdot cm/cm^2 \cdot s \cdot cmHg$ or lower at 150° C., a $CH_4$ permeability coefficient $P(CH_4)$ of $10 \times 10^{-9}$ $cm^3 \cdot cm/cm^2 \cdot s \cdot cmHg$ or lower at 150° C., a ratio $D(CO_2)/S(CO_2)$ between a $CO_2$ diffusion coefficient $D(CO_2)$ and a $CO_2$ solubility coefficient $S(CO_2)$ of $3 \times 10^{-5}$ $Pa \cdot m^2/s$ or higher at 150° C., and a ratio $D(CH_4)/S(CH_4)$ between a $CH_4$ diffusion coefficient $D(CH_4)$ and a $CH_4$ solubility coefficient $S(CH_4)$ of higher than $15 \times 10^{-5}$ $Pa \cdot m^2/s$ at 150° C.

4 Claims, 1 Drawing Sheet

(56) References Cited

OTHER PUBLICATIONS

International Search Report for PCT/JP2015/078310 dated Dec. 22, 2015 [PCT/ISA/210].

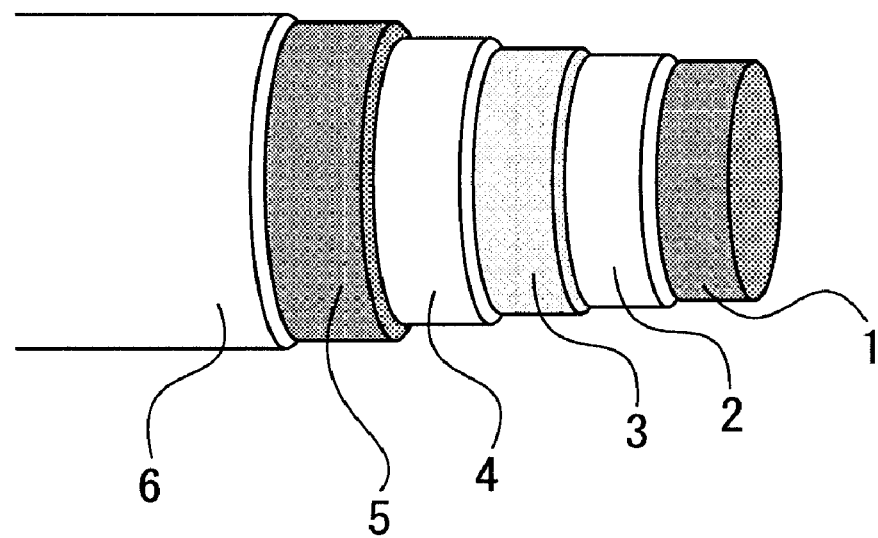

FLEXIBLE PIPE

CROSS REFERENCE TO RELATED APPLICATIONS

This application is a National Stage of International Application No. PCT/JP2015/078310 filed Oct. 6, 21015, claiming priority based on Japanese Patent Application No. 2014-212812 filed Oct. 17, 2014, the contents of all of which are incorporated herein by reference in their entirety.

TECHNICAL FIELD

The present invention relates to flexible pipes.

BACKGROUND ART

Pipes used in offshore oil fields include risers (pipes for pumping up crude oil), umbilicals (integration of pipes for supplying chemicals for crude oil viscosity reduction for the purpose of controlling the pumping, power cables, and others), flow lines (pipes for transporting pumped crude oil which extend on the sea floor), and the like. They have various structures, and known pipes include metal-made pipes and metal/resin hybrid pipes. In order to achieve weight reduction, use of metal-made pipes tends to be reduced and metal/resin hybrid pipes are becoming the mainstream. Since oil drilling sites become much deeper and the temperature of crude oil pumped therefrom rises, resins used for these pipes need to have better mechanical strength and chemical resistance at high temperatures (resistance to high-temperature crude oil, resistance to acidic gas, such as hydrogen sulfide, contained in crude oil at high temperatures, resistance to chemicals such as methanol, $CO_2$, and hydrogen chloride injected so as to reduce the crude oil viscosity at high temperatures), and lower permeability at high temperatures. Thus, there is a demand for materials which can take the place of polyamide (the operating temperature range is up to 90° C.) and polyvinylidene fluoride (the operating temperature range is up to 130° C.) which have been used for the pipes.

Patent Literature 1 discloses as a material suitable for flexible pipes a fluororesin which is a copolymer containing copolymerized units of tetrafluoroethylene, vinylidene fluoride, and an ethylenic unsaturated monomer excluding tetrafluoroethylene and vinylidene fluoride, and has a specific storage elastic modulus.

CITATION LIST

Patent Literature

Patent Literature 1: WO 2010/110129

SUMMARY OF INVENTION

Technical Problem

Flexible pipes are exposed to gas generated from an oil reservoir and gas such as $CO_2$ injected so as to push out crude oil from the oil reservoir during pumping of the crude oil. Thus, resin pipes constituting flexible pipes need to exhibit high barrier performance in order to prevent these gases (fluids) from leaking out of the resin pipes. Since currently the sites of oil fields become deeper and thus the temperature and pressure in the environment of pumping up crude oil become higher, there is a demand for further improvement of the barrier performance of resin pipes. One method of achieving this demand is to thicken the resin pipes. However, as the thickness of a resin pipe increases, blisters are more likely to occur due to gas dissolved in the resin in a high-temperature and high-pressure environment.

Thus, flexible pipes need to include a resin pipe which is less likely to cause blisters even if it has a greater thickness.

The present invention is developed in view of the above state of the art, and aims to provide a flexible pipe having excellent blister resistance in a high-temperature and high-pressure environment even though including a thick resin pipe.

Solution to Problem

The present invention relates to a flexible pipe including a resin pipe having a thickness of greater than 5 mm, the resin pipe being formed from a resin having a $CO_2$ permeability coefficient $P(CO_2)$ of $20\times10^{-9}$ cm$^3$·cm/cm$^2$·s·cmHg or lower at 150° C.; a $CH_4$ permeability coefficient $P(CH_4)$ of $10\times10^{-9}$ cm$^3$·cm/cm$^2$·s·cmHg or lower at 150° C.; a ratio $D(CO_2)/S(CO_2)$ between a $CO_2$ diffusion coefficient $D(CO_2)$ and a $CO_2$ solubility coefficient $S(CO_2)$ of $3\times10^{-5}$ Pa·m$^2$/s or higher at 150° C.; and a ratio $D(CH_4)/S(CH_4)$ between a $CH_4$ diffusion coefficient $D(CH_4)$ and a $CH_4$ solubility coefficient $S(CH_4)$ of higher than $15\times10^{-5}$ Pa·m$^2$/s at 150° C.

The resin preferably does not break in Izod impact testing at −40° C.

The resin is preferably a fluororesin or polyether ether ketone.

The flexible pipe of the present invention is preferably a riser pipe or a flow line.

Advantageous Effects of Invention

The flexible pipe of the present invention has excellent blister resistance in a high-temperature and high-pressure environment even though including a thick resin pipe.

BRIEF DESCRIPTION OF THE DRAWINGS

FIG. 1 is a schematic view of one example of the structure of a flexible pipe.

DESCRIPTION OF EMBODIMENTS

The present invention will be specifically described hereinbelow.

The present invention relates to a flexible pipe including a resin pipe having a thickness of greater than 5 mm. The resin pipe is formed from a resin having a $CO_2$ permeability coefficient $P(CO_2)$ of $20\times10^{-9}$ cm$^3$·cm/cm$^2$·s·cmHg or lower at 150° C., a $CH_4$ permeability coefficient $P(CH_4)$ of $10\times10^{-9}$ cm$^3$·cm/cm$^2$·s·cmHg or lower at 150° C., a ratio $D(CO_2)/S(CO_2)$ between a $CO_2$ diffusion coefficient $D(CO_2)$ and a $CO_2$ solubility coefficient $S(CO_2)$ of $3\times10^{-5}$ Pa·m$^2$/s or higher at 150° C., and a ratio $D(CH_4)/S(CH_4)$ between a $CH_4$ diffusion coefficient $D(CH_4)$ and a $CH_4$ solubility coefficient $S(CH_4)$ of higher than $15\times10^{-5}$ Pa·m$^2$/s at 150° C.

The flexible pipe of the present invention has excellent blister resistance in a high-temperature and high-pressure environment even though including a thick resin pipe having a thickness of greater than 5 mm. The high temperature herein means 100° C. or higher, preferably 130° C. or higher, more preferably 150° C. or higher. The upper limit thereof may be 200° C., for example. The high pressure herein means 70 MPa or higher, preferably 100 MPa or higher, more preferably 130 MPa or higher, still more preferably 150 MPa or higher. The upper limit thereof may be 350 MPa, for example. The flexible pipe of the present invention can exhibit excellently low permeability and excellent blister resistance even in a pumping environment at a pressure as high as 10 kpsi (about 70 MPa) or higher, 15 kpsi (about 105 MPa) or higher, or 20 kpsi (about 140 MPa) or higher.

The resin pipe of the flexible pipe of the present invention has a thickness of greater than 5 mm. The resin pipe having a thickness within the above range has excellent barrier performance in a high-temperature and high-pressure environment. Thus, the resin pipe can prevent various fluids (gases) flowing through the flexible pipe from leaking out of the resin pipe in a high-temperature and high-pressure environment. The thickness means the thickness in the radial direction of the resin pipe.

The thickness is preferably 6 mm or greater, more preferably 8 mm or greater, still more preferably 10 mm or greater. In view of the blister resistance, the flexibility, and the economic efficiency, the thickness is preferably 50 mm or smaller, more preferably 15 mm or smaller.

The resin pipe is a pipe formed from a resin. The resin constituting the resin pipe has a $CO_2$ (carbon dioxide) permeability coefficient $P(CO_2)$ of $20 \times 10^{-9}$ cm$^3 \cdot$cm/cm$^2 \cdot$s$\cdot$cmHg or lower at 150° C. This allows the resin pipe to exhibit excellent $CO_2$ barrier performance in a high-temperature environment. The permeability coefficient $P(CO_2)$ is more preferably $15 \times 10^{-9}$ cm$^3 \cdot$cm/cm$^2 \cdot$s$\cdot$cmHg or lower, still more preferably $13 \times 10^{-9}$ cm$^3 \cdot$cm/cm$^2 \cdot$s$\cdot$cmHg or lower. The lower limit thereof may be $0.1 \times 10^{-9}$ cm$^3 \cdot$cm/cm$^2 \cdot$s$\cdot$cmHg.

The resin has a $CH_4$ (methane) permeability coefficient $P(CH_4)$ of $10 \times 10^{-9}$ cm$^3 \cdot$cm/cm$^2 \cdot$s$\cdot$cmHg or lower at 150° C. This allows the resin pipe to exhibit excellent $CH_4$ barrier performance in a high-temperature environment. The permeability coefficient $P(CH_4)$ is more preferably $5 \times 10^{-9}$ cm$^3 \cdot$cm/cm$^2 \cdot$s$\cdot$cmHg or lower, still more preferably $3 \times 10^{-9}$ cm$^3 \cdot$cm/cm$^2 \cdot$s$\cdot$cmHg or lower. The lower limit thereof may be $0.1 \times 10^{-9}$ cm$^3 \cdot$cm/cm$^2 \cdot$s$\cdot$cmHg.

The permeability coefficients $P(CO_2)$ and $P(CH_4)$ can be determined by photoacoustic detection.

The resin has a ratio $D(CO_2)/S(CO_2)$ between a $CO_2$ diffusion coefficient $D(CO_2)$ and a $CO_2$ solubility coefficient $S(CO_2)$ of $3 \times 10^{-5}$ Pa$\cdot$m$^2$/s or higher at 150° C. The resin pipe formed from a resin having a ratio $D(CO_2)/S(CO_2)$ within the above range has excellent blister resistance in a high-temperature and high-pressure environment even though having a large thickness. As a result, the flexible pipe of the present invention including this resin pipe has excellent durability in a high-temperature and high-pressure environment.

The ratio $D(CO_2)/S(CO_2)$ may be $3.0 \times 10^{-5}$ Pa$\cdot$m$^2$/s or higher, preferably $5 \times 10^{-5}$ Pa$\cdot$m$^2$/s or higher, most preferably $10 \times 10^{-5}$ Pa$\cdot$m$^2$/s or higher. The upper limit thereof may be $100 \times 10^{-5}$ Pa$\cdot$m$^2$/s.

The resin has a ratio $D(CH_4)/S(CH_4)$ between a $CH_4$ diffusion coefficient $D(CH_4)$ and a $CH_4$ solubility coefficient $S(CH_4)$ of higher than $15 \times 10^{-5}$ Pa$\cdot$m$^2$/s at 150° C. The resin pipe formed from a resin having a ratio $D(CH_4)/S(CH_4)$ within the above range has excellent blister resistance in a high-temperature and high-pressure environment even though having a large thickness. As a result, the flexible pipe of the present invention including this resin pipe has excellent durability in a high-temperature and high-pressure environment.

The ratio $D(CH_4)/S(CH_4)$ is preferably $40 \times 10^{-5}$ Pa$\cdot$m$^2$/s or higher, more preferably $45 \times 10^{-5}$ Pa$\cdot$m$^2$/s or higher, most preferably $50 \times 10^{-5}$ Pa$\cdot$m$^2$/s or higher. The upper limit thereof may be $500 \times 10^{-5}$ Pa$\cdot$m$^2$/s.

The diffusion coefficients $D(CO_2)$ and $D(CH_4)$ can be determined by photoacoustic detection.

The solubility coefficients $S(CO_2)$ and $S(CH_4)$ can be determined by photoacoustic detection.

The resin preferably has no glass transition temperature or, if the resin has a glass transition temperature, the glass transition temperature is preferably 0° C. to 220° C. The resin pipe formed from a resin having no glass transition temperature or a glass transition temperature within the above range has excellent blister resistance in a high-temperature and high-pressure environment. If the resin has a glass transition temperature, the glass transition temperature is more preferably 10° C. to 210° C., still more preferably 30° C. to 200° C.

The glass transition temperature is determined by dynamic mechanical analysis using DVA-220 (IT Keisoku Seigyo K.K.). The temperature at a tan δ peak determined at a temperature-increasing rate of 2° C./min and a frequency of 10 Hz is defined as the glass transition temperature.

The resin preferably has a brittleness temperature of 0° C. or lower. The brittleness temperature is more preferably −20° C. or lower, still more preferably −40° C. or lower, most preferably −60° C. or lower.

The brittleness temperature is a value determined using a brittle point temperature tester model S (Toyo Seiki Seisakusho, Ltd.) in conformity with ASTM D746.

The resin preferably has a melting point of 180° C. to 400° C. The resin pipe formed from a resin having a melting point within the above range has excellent blister resistance in a high-temperature and high-pressure environment. The melting point is more preferably 200° C. to 350° C., still more preferably 200° C. to 290° C.

The melting point is determined by thermal analysis at a temperature-increasing rate of 10° C./min using a differential scanning calorimeter RDC220 (Seiko Instruments Inc.) in conformity with ASTM D-4591. The temperature corresponding to the peak of the resulting endothermic curve is defined as the melting point.

The resin preferably has a melt flow rate (MFR) of 0.1 to 50 g/10 min. The resin pipe formed from a resin having a MFR within the above range has excellent blister resistance in a high-temperature and high-pressure environment. The MFR is more preferably 0.2 to 30 g/10 min, still more preferably 0.3 to 10 g/10 min.

The MFR can be determined using a melt indexer (Toyo Seiki Seisaku-sho, Ltd.) in conformity with ASTM D3307-01. The MFR can be determined as the mass (g/10 min) of a polymer flowed out of a nozzle (inner diameter: 2 mm, length: 8 mm) per 10 minutes at a load of 5 kg and a temperature of 297° C. in the case of copolymers containing copolymerized units of tetrafluoroethylene, vinylidene fluoride, and an ethylenic unsaturated monomer to be mentioned later, 380° C. to 430° C. in the case of polyether ether ketone, or a temperature higher than the melting point by 50° C. in the case of any other resin.

The resin preferably has excellent impact resistance at low temperature. In other words, the resin preferably does not break in Izod impact testing at room temperature. The resin more preferably does not break in Izod impact testing at 0° C., still more preferably does not break in Izod impact testing at −20° C., particularly preferably does not break in Izod impact testing at −40° C.

In the Izod impact testing, the notched Izod impact strength is determined using U-F impact tester (Ueshima Seisakusho Co., Ltd.) in conformity with ASTM D256. The phrase "not break in Izod impact testing" herein means that a resin specimen is not divided into two or more fractions.

The resin may be fluororesin, polyether ether ketone (PEEK), polyimide, polyether ketone, polyether ketone ketone, polyether ketone ether ketone ketone, or any mixture thereof. In order to achieve excellent creep resistance at high temperature, fluororesin, polyether ether ketone (PEEK), and a mixture of fluororesin and PEEK are preferred. In order to achieve excellent impact resistance at low temperature, excellent crack resistance at high pressure, and excellent blister resistance in a high-temperature and high-pressure environment, fluororesin and a mixture of fluororesin and PEEK are more preferred.

In order to easily control the permeability coefficient and the diffusion coefficient/solubility coefficient ratio within the above ranges and to improve the blister resistance in a high-temperature and high-pressure environment, the fluororesin is preferably a copolymer containing copolymerized units of tetrafluoroethylene, vinylidene fluoride, and an ethylenic unsaturated monomer excluding tetrafluoroethylene and vinylidene fluoride.

The ethylenic unsaturated monomer may be any monomer copolymerizable with tetrafluoroethylene and vinylidene fluoride. Still, it is preferably at least one selected from the group consisting of ethylenic unsaturated monomers represented by either of the following formulas (1) and (2):

$$CX^1X^2=CX^3(CF_2)_nX^4 \quad \text{Formula (1)}$$

wherein $X^1$, $X^2$, $X^3$, and $X^4$ may be the same as or different from each other, and are each H, F, or Cl; n is an integer of 0 to 8, excluding tetrafluoroethylene and vinylidene fluoride, $$CF_2=CF-ORf^1 \quad \text{Formula (2)}$$

wherein $Rf^1$ is a C1-C3 alkyl group or a C1-C3 fluoroalkyl group.

The ethylenic unsaturated monomer represented by the formula (1) is preferably at least one selected from the group consisting of $CF_2=CFCl$, $CF_2=CFCF_3$, those represented by the following formula (3):

$$CH_2=CF-(CF_2)_nX^4 \quad (3)$$

(wherein $X^4$ and n are defined in the same manner as mentioned above), and those represented by the following formula (4):

$$CH_2=CH-(CF_2)_nX^4 \quad (4)$$

(wherein $X^4$ and n are defined in the same manner as mentioned above),
more preferably at least one selected from the group consisting of $CF_2=CFCl$, $CH_2=CFCF_3$, $CH_2=CH-C_4F_9$, $CH_2=CH-C_6F_{13}$, $CH_2=CF-C_3F_6H$, and $CF_2=CFCF_3$, still more preferably at least one selected from the group consisting of $CF_2=CFCl$ and $CH_2=CFCF_3$.

The ethylenic unsaturated monomer represented by the formula (2) is preferably at least one selected from the group consisting of $CF_2=CF-OCF_3$, $CF_2=CF-OCF_2CF_3$, and $CF_2=CF-OCF_2CF_2CF_3$.

The fluororesin is preferably a copolymer containing 55.0 to 90.0 mol % of a copolymerized unit of tetrafluoroethylene,
5.0 to 44.9 mol % of a copolymerized unit of vinylidene fluoride, and
0.1 to 10.0 mol % of a copolymerized unit of the ethylenic unsaturated monomer represented by the formula (1):

$$CX^1X^2=CX^3(CF_2)_nX^4 \quad (1)$$

wherein $X^1$, $X^2$, $X^3$, and $X^4$ may be the same as or different from each other, and are each H, F, or Cl; n is an integer of 0 to 8, excluding tetrafluoroethylene and vinylidene fluoride.

The fluororesin is more preferably a copolymer containing
55.0 to 85.0 mol % of a copolymerized unit of tetrafluoroethylene,
10.0 to 44.9 mol % of a copolymerized unit of vinylidene fluoride, and
0.1 to 5.0 mol % of a copolymerized unit of the ethylenic unsaturated monomer represented by the formula (1).

The fluororesin is still more preferably a copolymer containing
55.0 to 85.0 mol % of a copolymerized unit of tetrafluoroethylene,
13.0 to 44.9 mol % of a copolymerized unit of vinylidene fluoride, and
0.1 to 2.0 mol % of a copolymerized unit of the ethylenic unsaturated monomer represented by the formula (1).

In order to improve the mechanical strength of the fluororesin at high temperature, as well as to achieve excellently low permeability of the fluororesin, the ethylenic unsaturated monomer represented by the formula (1) is preferably at least one monomer selected from the group consisting of $CH_2=CH-C_4F_9$, $CH_2=CH-C_6F_{13}$, and $CH_2=CF-C_3F_6H$. More preferably, the ethylenic unsaturated monomer represented by the formula (1) is at least one monomer selected from the group consisting of $CH_2=CH-C_4F_9$, $CH_2=CH-C_6F_{13}$, and $CH_2=CF-C_3F_6H$ and the fluororesin is a copolymer containing
55.0 to 80.0 mol % of a copolymerized unit of tetrafluoroethylene,
19.5 to 44.9 mol % of a copolymerized unit of vinylidene fluoride, and
0.1 to 0.6 mol % of a copolymerized unit of the ethylenic unsaturated monomer represented by the formula (1)

The fluororesin may be a copolymer containing 58.0 to 85.0 mol % of a copolymerized unit of tetrafluoroethylene,
10.0 to 41.9 mol % of a copolymerized unit of vinylidene fluoride, and
0.1 to 5.0 mol % of a copolymerized unit of the ethylenic unsaturated monomer represented by the formula (1)

The fluororesin is also preferably a copolymer containing
55.0 to 90.0 mol % of a copolymerized unit of tetrafluoroethylene,
9.2 to 44.2 mol % of a copolymerized unit of vinylidene fluoride, and
0.1 to 0.8 mol % of a copolymerized unit of the ethylenic unsaturated monomer represented by the formula (2):

$$CF_2=CF-ORf^1 \quad (2)$$

wherein $Rf^1$ is a C1-C3 alkyl group or a C1-C3 fluoroalkyl group.

The fluororesin is more preferably a copolymer containing
58.0 to 85.0 mol % of a copolymerized unit of tetrafluoroethylene,
14.5 to 39.9 mol % of a copolymerized unit of vinylidene fluoride, and
0.1 to 0.5 mol % of a copolymerized unit of the ethylenic unsaturated monomer represented by the formula (2).

The fluororesin is also preferably a copolymer containing
55.0 to 90.0 mol % of a copolymerized unit of tetrafluoroethylene,
5.0 to 44.8 mol % of a copolymerized unit of vinylidene fluoride, 0.1 to 10.0 mol % of a copolymerized unit of the ethylenic unsaturated monomer represented by the formula (1), and 0.1 to 0.8 mol % of a copolymerized unit of the ethylenic unsaturated monomer represented by the formula (2).

The fluororesin is more preferably a copolymer containing 55.0 to 85.0 mol % of a copolymerized unit of tetrafluoroethylene, 9.5 to 44.8 mol % of a copolymerized unit of vinylidene fluoride, 0.1 to 5.0 mol % of a copolymerized unit of the ethylenic unsaturated monomer represented by the formula (1), and 0.1 to 0.5 mol % of a copolymerized unit of the ethylenic unsaturated monomer represented by the formula (2).

The fluororesin is still more preferably a copolymer containing 55.0 to 80.0 mol % of a copolymerized unit of tetrafluoroethylene, 19.8 to 44.8 mol % of a copolymerized unit of vinylidene fluoride, 0.1 to 2.0 mol % of a copolymerized unit of the ethylenic unsaturated monomer represented by the formula (1), and 0.1 to 0.3 mol % of a copolymerized unit of the ethylenic unsaturated monomer represented by the formula (2). The fluororesin having this composition has particularly excellently low permeability.

The fluororesin may be a copolymer containing 58.0 to 85.0 mol % of a copolymerized unit of tetrafluoroethylene, 9.5 to 39.8 mol % of a copolymerized unit of vinylidene fluoride, 0.1 to 5.0 mol % of a copolymerized unit of the ethylenic unsaturated monomer represented by the formula (1), and 0.1 to 0.5 mol % of a copolymerized unit of the ethylenic unsaturated monomer represented by the formula (2).

The fluororesin in which the amounts of the respective monomers are within the above ranges has better mechanical strength, better chemical resistance, and lower permeability at high temperature than conventionally known copolymers containing tetrafluoroethylene, vinylidene fluoride, and a third component. The low permeability at high temperature means, for example, low permeability to methane, hydrogen sulfide, $CO_2$, methanol, hydrochloric acid, and others.

The amounts of the respective monomers of the copolymer can be calculated by appropriately combining NMR and elemental analysis in accordance with the types of the monomers.

The fluororesin preferably has a pyrolysis starting temperature (1 mass % reduction temperature) of 360° C. or higher. The lower limit is more preferably 370° C. The upper limit of the pyrolysis starting temperature may be, for example, 410° C. as long as it is within the above range.

The pyrolysis starting temperature is the temperature at which 1 mass % of a fluororesin subjected to a heating test is decomposed, and is a value obtained by determining the temperature at which the mass of the fluororesin subjected to the heating test is reduced by 1 mass % using a thermogravimetry-differential thermal analyzer (TG-DTA).

The fluororesin may be produced by polymerization such as solution polymerization, bulk polymerization, emulsion polymerization, or suspension polymerization. For industrially easy production, the fluororesin is preferably produced by emulsion polymerization or suspension polymerization.

In the above polymerization, a polymerization initiator, a surfactant, a chain-transfer agent, and a solvent may be used, and each may be conventionally known one.

The polymerization initiator may be an oil-soluble radical polymerization initiator or a water-soluble radical initiator.

The oil-soluble radical polymerization initiator may be a known oil-soluble peroxide. Typical examples thereof include dialkyl peroxycarbonates such as diisopropyl peroxydicarbonate, di-n-propyl peroxydicarbonate, and di-sec-butyl peroxydicarbonate; peroxy esters such as t-butyl peroxyisobutyrate and t-butyl peroxypivalate; dialkyl peroxides such as di-t-butyl peroxide, as well as di(perfluoro)acyl (or di(fluorochloro)acyl) peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutylyl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutylyl)peroxide, di(ω-chloro-decafluorohexanoyl)peroxide, di(ω-chloro-tetradecafluorooctanoyl)peroxide, co-hydro-dodecafluoroheptanoyl-ω-hydrohexadecafluorononanoyl-peroxide, ω-chloro-hexafluorobutylyl-ω-chloro-decafluorohexanoyl-peroxide, ω-hydrododecafluoroheptanoyl-perfluorobutylyl-peroxide, di(dichloropentafluorobutanoyl)peroxide, di(trichloroocta-fluorohexanoyl)peroxide, di(tetrachloroundecafluorooc-tanoyl)peroxide, di(pentachlorotetradecafluorodecanoyl)peroxide, and di(undecachlorodotriacontafluorodocosanoyl)peroxide.

The water-soluble radical polymerization initiator may be a known water-soluble peroxide, and examples thereof include ammonium salts, potassium salts, sodium salts, t-butyl permaleate, and t-butyl hydroperoxide of persulfuric acid, perboric acid, perchloric acid, perphosphoric acid, or percarbonic acid. Any reducing agent such as a sulfite or a sulfurous acid salt may be used in combination with a peroxide, and the amount thereof may be 0.1 to 20 times the amount of the peroxide.

The surfactant may be a known surfactant, and examples thereof include nonionic surfactants, anionic surfactants, and cationic surfactants. Preferred are fluorine-containing anionic surfactants, and more preferred are C4-C20 linear or branched fluorine-containing anionic surfactants optionally containing etheric oxygen (in other words, an oxygen atom may be present between carbon atoms). The amount thereof (relative to the water where the polymerization occurs) is preferably 50 to 5000 ppm.

Examples of the chain-transfer agent include hydrocarbons such as ethane, isopentane, n-hexane, and cyclohexane; aromatic substances such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound, and is usually 0.01 to 20 mass % relative to the polymerization solvent.

Examples of the solvent include water and solvent mixtures of water and an alcohol.

In suspension polymerization, a fluorine-based solvent may be used in addition to water. Examples of the fluorine-based solvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_2CF_3$. Preferred are perfluoroalkanes. In view of the suspension performance and economic efficiency, the amount of the fluorine-based solvent is preferably 10 to 100 mass % relative to the aqueous medium.

The polymerization temperature may be any temperature, and may be 0° C. to 100° C. The polymerization pressure is appropriately determined in accordance with other polymerization conditions, such as the type and amount of a solvent, the vapor pressure, and the polymerization temperature. It may usually be 0 to 9.8 MPaG.

The resin may be mixed with any additive such as a filler, a plasticizer, a processing aid, a release agent, a pigment, a flame retardant, a lubricant, a photostabilizer, a weather resistance stabilizer, a conductive agent, an antistatic, an ultraviolet absorber, an antioxidant, a foaming agent, a perfume, an oil, a softening agent, and a dehydrofluorinating agent, before molding. Examples of the filler include polytetrafluoroethylene, mica, silica, talc, celite, clay, titanium oxide, and barium sulfate. Examples of the conductive agent include carbon black. Examples of the plasticizer include dioctyl phthalate and pentaerythritol. Examples of the processing aid include carnauba wax, sulfone compounds, low molecular weight polyethylene, and fluorine-based aids. Examples of the dehydrofluorinating agent include organic onium and amidines.

The resin pipe may be produced by, for example, extrusion-molding the resin.

One embodiment of the flexible pipe of the present invention is shown in FIG. 1. Still, the flexible pipe of the present invention is not limited thereto.

A pipe (fluid barrier layer) 2 corresponds to the resin pipe in the present invention, and prevents a resource flowing through the flexible pipe from leaking out of the pipe. The resin pipe has excellently low permeability in a high-temperature and high-pressure environment. Thus, even when corrosive gas, such as hydrogen sulfide or carbon dioxide, at high temperature and high pressure flows through the pipe, the layers outside the pipe 2 are less likely to be attacked by such corrosive gas. The resin pipe also has excellent blister resistance in a high-temperature and high-pressure environment. Thus, even when exposed to methane, carbon dioxide, or hydrogen at high temperature and high pressure, the pipe 2 is less likely to suffer blisters. When high-temperature and high-pressure fluid flows through a pipe, the materials constituting the pipe 2 may thrust into a reinforcing layer 3, deform, or suffer cracking. In contrast, the flexible pipe of the present invention including the above resin pipe can overcome these problems.

A body (carcass) 1 is disposed inside the pipe 2, and it can withstand a high pressure to maintain the pipe shape even when the flexible pipe is applied to deep-sea uses. A reinforcing layer 3 and a reinforcing layer 5 made of metal are disposed around the pipe 2, and a friction-resistant layer 4 for preventing friction is disposed between the reinforcing layer 3 and the reinforcing layer 5. The reinforcing layers 3 and 5 act to prevent burst of the flexible pipe due to the pressure of a resource flowing through the pipe. These reinforcing layers may be made of metal. If the reinforcing layers 3 and 5 have different structures, the pipe can withstand stresses applied in different directions. In order to prevent damages on the pipe 2 which may be generated by contact with the metal reinforcing layers, a thermoplastic resin layer may be disposed between the pipe 2 and the body 1 or reinforcing layer 3. The thermoplastic resin layer may be formed from the same material as the pipe 2, or may be formed from a different material. An outer layer resin 6 is disposed around the reinforcing layer 5, and has a function of partitioning the inside and outside of the flexible pipe. The outer layer resin 6 may be formed from polyethylene or polyamide.

The flexible pipe of the present invention can be suitably used as a riser pipe or a flow line for transporting a resource from the sea floor to the surface of the sea in an offshore oil or gas field. Examples of the resource include fluids such as crude oil, petroleum gas, and natural gas.

Use of the flexible pipe in an environment at 100° C. or higher and 70 MPa or higher is also one aspect of the present invention. The flexible pipe can be used in an environment at 130° C. or higher and in an environment at 100 MPa or higher, 130 MPa or higher, or 150 MPa or higher.

EXAMPLES

Next, the present invention is described referring to, but not limited to, examples.

The parameters in the examples were determined by the following methods.

Monomer Composition (Fluororesin)

The monomer composition was determined by $^{19}$F-NMR using a nuclear magnetic resonance device AC300 (Bruker-Biospin) with a measurement temperature set to the polymer melting point+20° C., optionally in combination with elemental analysis as appropriate in accordance with the integral values of the respective peaks and the types of the monomers.

Glass Transition Temperature

The glass transition temperature was determined by dynamic mechanical analysis using DVA-220 (IT Keisoku Seigyo K.K.). The temperature at a tan δ peak determined at a temperature-increasing rate of 2° C./min and a frequency of 10 Hz was defined as the glass transition temperature.

Melting Point

The melting point was determined by thermal analysis at a temperature-increasing rate of 10° C./min using a differential scanning calorimeter RDC220 (Seiko Instruments Inc.) in conformity with ASTM D-4591. The temperature corresponding to the peak of the resulting endothermic curve is defined as the melting point.

Melt Flow Rate (MFR)

The MFR was determined as the mass (g/10 min) of a polymer flowed out of a nozzle (inner diameter: 2 mm, length: 8 mm) per 10 minutes at a load of 5 kg and a temperature of 297° C. using a melt indexer (Toyo Seiki Seisaku-sho, Ltd.) in conformity with ASTM D3307-01.

Pyrolysis Starting Temperature (1 Mass % Reduction Temperature)

The temperature at which the mass of the fluororesin subjected to the heating test was reduced by 1 mass % using a thermogravimetry-differential thermal analyzer (TG-DTA) was defined as the pyrolysis starting temperature.

Permeability Coefficient, Diffusion Coefficient, and Solubility Coefficient

The permeability coefficient, diffusion coefficient, and solubility coefficient were determined by photoacoustic detection using WaSul-Perm system (Hilase) with $N_2$ flow at the detection side and test gas flow at the test gas side.

Blister Resistance Test (RGD Test)

A predetermined gas is charged into a pressure-resistant container up to a predetermined pressure. The system was warmed up to a predetermined temperature and a sample was immersed therein for one week, and then decompressed at 70 bar/min. The system was again pressurized and warmed, and the sample was immersed therein for 24 hours, and then decompressed at 70 bar/min. The cycle of pressurization, warming, and decompression was repeated 20 times, and the sample was checked for blisters and slits.

Izod Impact Testing

The notched Izod impact strength at a thickness of 12.7±2 mm was determined using a U-F impact tester (Ueshima Seisakusho Co., Ltd.) in conformity with ASTM D256.

Example 1

A fluororesin A (copolymer of tetrafluoroethylene/vinylidene fluoride/ethylenic unsaturated monomer, MRF: 2.0 g/10 min, melting point: 217° C., Izod impact testing: not break at −40° C., Tg: absence, 1 mass % reduction temperature: 386° C.) was used. The permeability coefficients (P), diffusion coefficients (D), solubility coefficients (S), and diffusion coefficient (D)/solubility coefficient (S) ratios were as shown in Table 1. The permeability coefficients (P), diffusion coefficients (D), and solubility coefficients (S) were determined by the aforementioned photoacoustic detection using a 1-mm-thick sample obtained by press-molding the fluororesin A with a 300° C. heat press.

TABLE 1

|  |  | Permeability coefficient (P) ($10^{-9}$ cm$^3$ · cm/ cm$^2$ · s · cmHg) | | Diffusion coefficient (D) ($10^{-12}$ m$^2$/s) | | Solubility coefficient (S) ($10^{-7}$ 1/Pa) | | Diffusion coefficient (D)/ Solubility coefficient (S) ($10^{-5}$ Pa · m$^2$/s) | |
|---|---|---|---|---|---|---|---|---|---|
|  |  | Gas | | | | | | | |
|  |  | $CO_2$ | $CH_4$ | $CO_2$ | $CH_4$ | $CO_2$ | $CH_4$ | $CO_2$ | $CH_4$ |
| Temperature (° C.) | 50 | 2.19 | 0.05 | 9.2 | 5.7 | 179.0 | 6.92 | 0.05 | 0.82 |
|  | 100 | 4.08 | 0.42 | 78.6 | 61.4 | 39.0 | 5.13 | 2.02 | 11.97 |
|  | 150 | 12.78 | 2.39 | 317.0 | 303.0 | 30.3 | 5.93 | 10.46 | 51.10 |

The fluororesin A was extrusion-molded into a pipe sample having an outer diameter of 90 mm and a thickness of 6 mm under the conditions as shown in Table 2. This pipe was cut into a sample A having a size of 2.5 cm×5 cm.

(RGD Testing)

The sample A was put into a pressure-resistant container. The pressure and the temperature were increased up to 15 kpsi and 130° C. with 100% $CO_2$ gas. The system was maintained for one week until it reached an equilibrium state, and then decompressed at 70 bar/min. The cycle of pressurization, warming, and decompression was repeated 20 times in accordance with the aforementioned method. No blisters or slits were observed on the sample A after the test.

TABLE 2

| Molding conditions | | | | | | |
|---|---|---|---|---|---|---|
|  | C1 | C2 | C3 | C4 | adapter | D1 |
| Cylinder temperature (° C.) | 280 | 290 | 300 | 310 | 320 | 330 |
| Screw rotational speed | 80 rpm | | | | | |
| Sizing die tank temperature | 25° C. | | | | | |
| Line speed | 0.2 m/min | | | | | |

Comparative Example 1

A PVDF resin (MRF: 2.5 to 4.0 g/10 min, melting point: 170° C., Izod impact testing: broke at −40° C. (Izod impact strength: 27.2 kg·cm/cm$^2$), Tg: −40° C., 1 mass % reduction temperature: 383° C.) was used. The permeability coefficients (P), diffusion coefficients (D), solubility coefficients (S), and diffusion coefficient (D)/solubility coefficient (S) ratios were as shown in Table 3. The permeability coefficients (P), diffusion coefficients (D), and solubility coefficients (S) were determined by the aforementioned photoacoustic detection using a 1-mm-thick sample obtained by press-molding the PVDF resin with a 240° C. heat press.

TABLE 3

|  |  | Permeability coefficient (P) ($10^{-9}$ cm$^3$ · cm/ cm$^2$ · s · cmHg) | | Diffusion coefficient (D) ($10^{-12}$ m$^2$/s) | | Solubility coefficient (S) ($10^{-7}$ 1/Pa) | | Diffusion coefficient (D)/ Solubility coefficient (S) ($10^{-5}$ Pa · m$^2$/s) | |
|---|---|---|---|---|---|---|---|---|---|
|  |  | Gas | | | | | | | |
|  |  | $CO_2$ | $CH_4$ | $CO_2$ | $CH_4$ | $CO_2$ | $CH_4$ | $CO_2$ | $CH_4$ |
| Temperature (° C.) | 50 | 1.13 | 0.01 | 2.49 | 1.56 | 342.00 | 6.53 | 0.01 | 0.24 |
|  | 100 | 2.77 | 0.21 | 33.10 | 31.00 | 62.90 | 4.99 | 0.53 | 6.21 |
|  | 150 | 13.30 | 1.88 | 164.00 | 230.00 | 61.00 | 6.15 | 2.69 | 37.40 |

The PVDF resin was extrusion-molded into a pipe sample having an outer diameter of 90 mm and a thickness of 6 mm under the conditions as shown in Table 4. This pipe was cut into a sample B having a size of 2.5 cm×5 cm.

(RGD Testing)

The sample B was put into a pressure-resistant container. The pressure and the temperature were increased up to 15 kpsi and 130° C. with 100% $CO_2$ gas. The system was maintained for one week until it reached an equilibrium state, and then decompressed at 70 bar/min. The cycle of pressurization, warming, and decompression was repeated 20 times in accordance with the aforementioned method. Many blisters and slits were observed on the sample B after the test.

TABLE 4

| Molding conditions | | | | | | |
|---|---|---|---|---|---|---|
| | C1 | C2 | C3 | C4 | adapter | D1 |
| Cylinder temperature (° C.) | 220 | 230 | 240 | 250 | 260 | 270 |
| Screw rotational speed | | | 70 rpm | | | |
| Sizing die tank temperature | | | 25° C. | | | |
| Line speed | | | 0.2 m/min | | | |

REFERENCE SIGNS LIST

1: Body (carcass)
2: Pipe (fluid barrier layer)
3: Reinforcing layer
4: Friction-resistant layer
5: Reinforcing layer
6: Outer layer resin

The invention claimed is:

1. A flexible pipe comprising
a resin pipe having a thickness of greater than 5 mm,
the resin pipe being formed from a resin having a $CO_2$ permeability coefficient $P(CO_2)$ of $20 \times 10^{-9}$ cm$^3$·cm/cm$^2$·s·cmHg or lower at 150° C.; a $CH_4$ permeability coefficient $P(CH_4)$ of $10 \times 10^{-9}$ cm$^3$·cm/cm$^2$·s·cmHg or lower at 150° C.; a ratio $D(CO_2)/S(CO_2)$ between a $CO_2$ diffusion coefficient $D(CO_2)$ and a $CO_2$ solubility coefficient $S(CO_2)$ of $3 \times 10^{-5}$ Pa·m$^2$/s or higher at 150° C.; and a ratio $D(CH_4)/S(CH_4)$ between a $CH_4$ diffusion coefficient $D(CH_4)$ and a $CH_4$ solubility coefficient $S(CH_4)$ of higher than $15 \times 10^{-5}$ Pa·m$^2$/s at 150° C.

2. The flexible pipe according to claim 1, wherein the resin does not break in Izod impact testing at −40° C.

3. The flexible pipe according to claim 1, wherein the resin is a fluororesin or polyether ether ketone.

4. The flexible pipe according to claim 1, which is a riser pipe or a flow line.

* * * * *